(12) United States Patent
Ciampini et al.

(10) Patent No.: US 9,028,037 B2
(45) Date of Patent: May 12, 2015

(54) INK-JET PRINT HEAD COMPRISING A LAYER MADE BY A CURABLE RESIN COMPOSITION

(75) Inventors: Davide Ciampini, Arnad (IT); Luigina Gino, Arnad (IT); Norma Giordano, Arnad (IT)

(73) Assignee: Sicpa Holding SA, Prilly (CH)

( * ) Notice: Subject to any disclaimer, the term of this patent is extended or adjusted under 35 U.S.C. 154(b) by 0 days.

(21) Appl. No.: 14/124,155

(22) PCT Filed: May 30, 2012

(86) PCT No.: PCT/EP2012/060132
§ 371 (c)(1),
(2), (4) Date: Apr. 10, 2014

(87) PCT Pub. No.: WO2012/168121
PCT Pub. Date: Dec. 13, 2012

(65) Prior Publication Data
US 2014/0218437 A1  Aug. 7, 2014

(30) Foreign Application Priority Data

Jun. 6, 2011 (IT) .............................. MI2011A1011

(51) Int. Cl.
| | | |
|---|---|---|
| B41J 2/015 | (2006.01) | |
| B41J 2/135 | (2006.01) | |
| B41J 2/14 | (2006.01) | |
| B41J 2/16 | (2006.01) | |
| C08G 59/68 | (2006.01) | |
| C08G 65/22 | (2006.01) | |
| C08L 63/00 | (2006.01) | |

(52) U.S. Cl.
CPC B41J 2/14 (2013.01); B41J 2/1603 (2013.01); B41J 2/1631 (2013.01); B41J 2/1639 (2013.01); B41J 2/1645 (2013.01); B41J 2202/03 (2013.01); C08G 59/68 (2013.01); C08G 65/226 (2013.01); C08L 63/00 (2013.01); C08L 2205/02 (2013.01); B41J 2/1606 (2013.01); B41J 2/164 (2013.01); B41J 2002/14362 (2013.01)

(58) Field of Classification Search
USPC ......................................... 347/19, 20, 44, 63
See application file for complete search history.

(56) References Cited

U.S. PATENT DOCUMENTS

| | | |
|---|---|---|
| 4,087,585 A | 5/1978 | Schulz |
| 5,150,132 A | 9/1992 | Shimomura et al. |
| 5,194,649 A | 3/1993 | Okawa |

(Continued)

FOREIGN PATENT DOCUMENTS

| | | |
|---|---|---|
| EP | 2 043 865 | 4/2009 |
| WO | 00/02730 | 1/2000 |
| WO | 2006/067814 | 6/2006 |

OTHER PUBLICATIONS

International Search Report for PCT/EP2012/060132, mailed on Jul. 31, 2012.

*Primary Examiner* — Jason Uhlenhake
(74) *Attorney, Agent, or Firm* — Greenblum & Bernstein, P.L.C.

(57) ABSTRACT

The present invention relates to an ink-jet print head able to resist to chemically aggressive solvent-based inks, and to a process for the manufacturing thereof, the ink-jet print head comprising a polymeric material layer defining ink passage ways formed on a substrate, said polymeric material layer being formed by curing a curable resin composition comprising a cyclic aromatic di-functional epoxy resin, a cyclic aliphatic di-functional epoxy resin and a polymerization initiator. The invention also relates to an improved curable resin composition.

29 Claims, 3 Drawing Sheets

(56) References Cited

U.S. PATENT DOCUMENTS

| | | |
|---|---|---|
| 5,248,715 A | 9/1993 | Gray et al. |
| 5,478,606 A | 12/1995 | Ohkuma et al. |
| 5,744,507 A | 4/1998 | Angell et al. |
| 6,193,359 B1 | 2/2001 | Patil et al. |
| 6,455,112 B1 | 9/2002 | Ohkuma et al. |
| 6,638,439 B2 | 10/2003 | Shimomura |
| 6,793,326 B2 | 9/2004 | Imamura et al. |
| 2005/0238299 A1* | 10/2005 | Takahashi ............ 385/100 |

* cited by examiner

INK-JET PRINT HEAD COMPRISING A LAYER MADE BY A CURABLE RESIN COMPOSITION

FIELD OF THE INVENTION

The present invention relates to an ink-jet print head comprising a layer made by an improved curable resin composition, a process for the manufacturing thereof, and an improved curable resin composition able to resist to chemically aggressive solvent-based inks.

BACKGROUND OF THE INVENTION

The ink-jet print head of an ink-jet printer generally comprises a substrate, a barrier layer and a nozzle plate. The substrate is generally made of silicon. Various layers are deposited on a face of the silicon substrate to make up the ejection resistors and the active electronic components. The barrier layer is generally made of a photopolymer. Using photolithographic techniques, the ejection chambers and the microidraulic conducts for the ink delivery are realized in the photopolymer barrier layer. The nozzle plate is generally made of a plastic material, such as, for example, polyimide, or a metallic material, such as, for example, palladium plated nickel, rhodium plated nickel, or gold plated nickel. The nozzle plate provided with ejection nozzles made in correspondence with the ejection resistors and the ejection chambers is attached to the barrier layer.

In recent years, the nozzle plate has been made integrally with the barrier layer. The layer forming the barrier layer and the nozzle plate is known in the art as structural layer. In such a case, the manufacturing process includes a step of forming a pattern of the ejection chambers and the microidraulic conducts with a soluble resin or a metal, a step of coating a photopolymer covering the soluble resin or metal pattern, a step of forming orifices in the photopolymer in correspondence of the ejection chambers over the ejection resistors, a step of curing the photopolymer, and a step of dissolving the soluble resin or metal.

There are several problems which arise with respect to the photopolymer employed to make either the barrier layer or the structural layer.

The first problem is that the ink chemically attacks the photopolymer material and causes either leakage between the channels and/or leakage to the outside of the print heads and also causes swelling of the barriers. Swelling results in a change in channel geometry and a degradation from optimized performance.

The problem of chemical attack is becoming particularly relevant in recent years due to the use of chemically aggressive solvent-based inks employed to print on plastic materials. Solvent-based inks typically comprise organic solvents, such as, for example, alcohols, glycols, ethers, esters, and so on. Print heads designed for water-based inks have been proven not to resist the attack of solvent-based inks, with a loss of their integrity within a few weeks from charging.

The second problem is the resolution required upon patterning with a radiation source. The manufacturing of barrier or structural layers requires a resolution of approximately 20 micron which is in between the typical specifications of materials for printed circuit board, which have a resolution of approximately 200 micron and those for integrated circuits, which have a resolution of approximately 1 micron. The materials commonly used in the manufacture of printed circuit boards can not be used because these materials do not provide the high order of resolution that is required. If these materials are used to fabricate barrier or structural layers, the resulting layers are rough and granular. These are defects which cause unwanted flow discontinuities, obstructions and turbulence within the ink channels. On the other hand, the materials commonly used for integrated circuits are unusable because they are optimized to resolve dimensions on the order of 1 micron. When used to fabricate layers having thickness of approximately 25 microns, most integrated circuit materials lose all resolution. The material to be removed from the channels becomes too polymerized and can not be removed by conventional techniques.

The third problem is adhesion of the photopolymer layer to the substrate and/or to the nozzle plate. As mentioned above, conventional ink-jet print heads may comprise nozzle plates having a metal surface of palladium or gold. Also, the active electronic components realized on the substrate often comprise metal surfaces of gold or other materials showing low adhesion characteristics. Further, the adhesion of the photopolymer layer to the substrate and/or to the nozzle plate is also jeopardized by the mechanical strength of the photopolymer material, in particular when the manufacturing process of the print head requires thermal treatments. The thermal treatments promote the formation of mechanical stress which cannot be compensated by a material having high mechanical strength. U.S. Pat. No. 5,150,132 describes an ink-resistant material useful to make any component, particularly a top plate, of a print head having a surface contacting the ink. The material is disclosed to have high glass transition point (Tg) and excellent heat resistant properties. The component of the print head is disclosed to be realized by molding, preferably by casting molding or compression molding.

U.S. Pat. No. 5,478,606 discloses an ink-jet print head comprising a structural layer formed by curing a radiation-curable resin composition comprising an epoxy resin, such as, for example, those obtained from the reaction product between bisphenol A and epichlorohydrin, the reaction product between bromine-containing bisphenol A and epichlorohydrin, the reaction product between phenolic novolak or o-cresol novolak and epichlorohydrin, and the polyfunctional epoxy resins having oxycyclohexane skeleton. The resulting structural layer showed an excellent mechanical strength, adhesion and ink resistance. Moreover, in case of solid epoxy resin, at room temperature, the patterning characteristics are also excellent.

U.S. Pat. Nos. 6,455,112 and 6,638,439 disclose the use of polyfunctional epoxy resins having oxycyclohexane skeleton to form structural layers of an ink-jet print head.

U.S. Pat. No. 6,793,326 discloses that structural layers made of cationic polymerized product of alicyclic epoxy resins showed a peeling in case of high internal stress because of a high mechanical strength. The proposed solution suggests making the structural layer by curing a radiation curable resin composition comprising an epoxy resin having at least two epoxy groups and obtained from the polymerization of acrylic monomers bearing epoxy groups.

U.S. Pat. No. 6,193,359 discloses an ink-jet print head comprising a barrier layer formed by curing a radiation-curable resin composition comprising from 5 to 50 weight percent of a first multifunctional epoxy compound, typically a di-functional epoxy compound, from about 0.05 to about 20 weight percent of a second multifunctional epoxy compound, from about 1.0 to about 10 weight percent of a photo-initiator, and from about 20 to about 90 weight percent of a non-photo-reactive solvent. The cured composition is told to have greater resolution, higher aspect ratios, enhanced adhesion to metal surfaces, and resistance to ink chemical attack. However, the examples of the specification demonstrate that such a composition does not show a good adhesion to conventional nozzle plates.

The foregoing status of the art thus indicates that there is a need for a continuous research and improvement for a photopolymer layer material which can withstand the attack of chemically aggressive inks, provide the required ink channel resolution, stop delamination of the photopolymer layer from metal surfaces of gold or other metals showing low adhesion characteristics, and be easily employed in manufacturing processes.

EP 2 043 865 discloses a curable resin composition comprising a cyclic aliphatic multifunctional epoxy resin, a cyclic aliphatic di-functional epoxy resin, and a photo-initiator employed to manufacture a polymeric material layer defining ink passage ways in an ink-jet print head.

SUMMARY OF THE INVENTION

The present invention relates to an ink-jet print-head comprising a polymeric material layer defining ink passage ways formed on a substrate, said polymeric material layer being formed by curing a curable resin composition comprising a cyclic aromatic di-functional epoxy resin, a cyclic aliphatic di-functional epoxy resin and a polymerization initiator.

In another aspect, the present invention relates to a process for manufacturing an ink-jet print head comprising a polymeric material layer defining ink passage ways and ejection chambers formed on a substrate, said process comprising the steps of: providing a substrate comprising a plurality of ink ejection energy generating elements on a surface thereof, applying a layer of curable resin composition on said surface of said substrate, and curing said layer of curable resin composition so as to form said polymeric material layer, wherein the curable resin composition comprises a cyclic aromatic di-functional epoxy resin, a cyclic aliphatic di-functional epoxy resin and a polymerization initiator.

In a further aspect, the present invention relates to a curable resin composition comprising a cyclic aromatic di-functional epoxy resin, a cyclic aliphatic di-functional epoxy resin, and, optionally, a polymerization initiator.

The Applicant has found that the photopolymer layer made with the curable resin composition described herein-below can withstand the corrosion of organic solvent-based inks without swelling and loss of adhesion.

Further, the Applicant has found that the curable resin composition described herein-below can provide the required ink channel resolution for a polymeric material layer defining ink passage ways of an ink-jet print head.

Additionally, the Applicant has found that the photopolymer layer made with the curable resin composition described herein-below does not delaminate from metal surfaces of gold or other metals showing low adhesion characteristics.

Finally, the Applicant has found that the curable resin composition described herein-below can be easily handled and employed in manufacturing processes.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
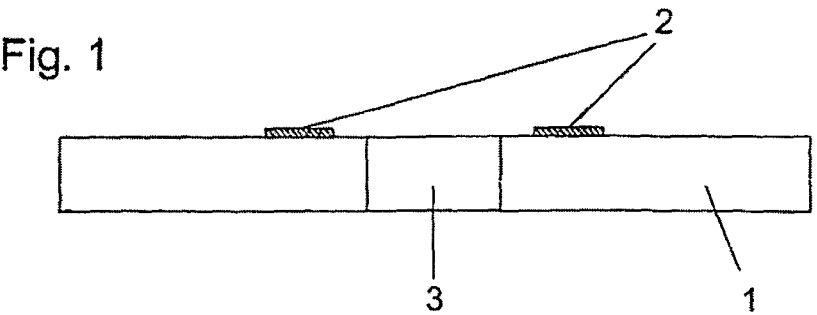
FIG. 1 shows a schematic section view of a substrate for an ink-jet print head.

Accordingly, the present invention relates to an ink-jet print head comprising a polymeric material layer defining ink passage ways formed on a substrate, said polymeric material layer being formed by curing a curable resin composition comprising a cyclic aromatic di-functional epoxy resin, a cyclic aliphatic di-functional epoxy resin and a polymerization initiator.

Preferably, the curable resin composition comprises (a) a cyclic aromatic di-functional epoxy resin obtained by the condensation of bisphenol A and epichlorohydrin having an epoxide equivalent weight (EEW) of at least 400 g/eq.

Advantageously, the curable resin composition comprises (b) a cyclic aliphatic di-functional epoxy resin represented by the following general formula (I):

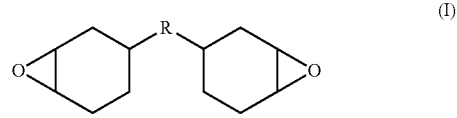

(I)

wherein R is a carboxyalkylene group of formula —$(CH_2)_p$—COO— or —$(CH_2)_q$—COO—$(CH_2)_r$—OOC—$(CH_2)_s$— and p, q, r, and s each independently is an integer of from 1 to 9.

Preferably, the cyclic aromatic di-functional epoxy resin useful in the present invention has an epoxide equivalent weight (EEW) lower than 1,000 g/eq. More preferably, the epoxide equivalent weight (EEW) of the cyclic aromatic di-functional epoxy resin useful in the present invention is ranging between 500 and 800 g/eq.

Examples of cyclic aromatic di-functional epoxy resin are commercial products distributed under the trade name EPIKOTE 1001, 1001 MSQ, 1002 and 1003 (by Hexion Specialty Chemicals, Inc.), ARALDITE 6071, 7071 and 7072 (by Huntsman Corporation), and DOW EPDXY DER 661, 662E, 671, 692, 692H and 692HB (Dow Chemical Company).

The curable resin composition preferably comprises less than 40% by weight, more preferably less than 30% by weight, of the cyclic aromatic di-functional epoxy resin. The curable resin composition preferably comprises at least 5% by weight, more preferably at least 10% by weight, of the cyclic aromatic di-functional epoxy resin. Most preferably, the curable resin composition comprises from 15% to 25% by weight of the cyclic aromatic di-functional epoxy resin.

In the above mentioned formula (I), p, q, r, and s each independently is preferably an integer of from 1 to 5. In the above mentioned formula (I), R is preferably a carboxyalkylene group of formula —$CH_2$—COO—, —$(CH_2)_2$—COO—, —$(CH_2)_3$—COO—, —$(CH_2)_4$—COO—, —$CH_2$—COO—$CH_2$—OOC—$CH_2$—, —$(CH_2)_2$—COO—$CH_2$—OOC—$(CH_2)_2$—, —$(CH_2)_3$—COO—$CH_2$—OOC—$(CH_2)_3$—, —$(CH_2)_3$—COO—$(CH_2)_2$—OOC—$(CH_2)_3$—.

Examples of cyclic aliphatic di-functional epoxy resin represented by the general formula (I) are commercial products distributed by Dow Chemical Company under the tradename CYRACURE UVR-6110, CYRACURE UVR-6107, CYRACURE UVR-6105, and CYRACURE UVR-6128, and by Deicel Chemical Industries, Ltd. under the tradename CELLOXIDE 2021 P, CELLOXIDE 2081, and CELLOXIDE 3000.

The curable resin composition preferably comprises less than 50% by weight, more preferably less than 40% by weight, of the cyclic aliphatic di-functional epoxy resin. The curable resin composition preferably comprises at least 10% by weight, more preferably at least 20% by weight, of the cyclic aliphatic di-functional epoxy resin. Most preferably, the curable resin composition comprises from 25% to 35% by weight of the cyclic aliphatic di-functional epoxy resin.

In another aspect, the present invention relates to a curable resin composition comprising the above described cyclic aromatic di-functional epoxy resin, a cyclic aliphatic di-functional epoxy resin, and a polymerization initiator.

The curable resin composition of the invention can be radiation cured or thermal cured. In a preferred embodiment of the invention, the curable resin composition of the present invention comprises a photo-initiator.

Examples of photo-initiator include cationic photo-initiators. The use of a cationic photo-initiator in the epoxy resin composition is preferred because the cationic polymerized substance of the epoxy resin has a relatively high crosslinking density resulting in a desired Tg comprised in the range of from 100° to 180° C., preferably from 120° to 160° C. and shows excellent characteristics as a structural material. Another advantage of the use of cationic photo-initiators is that such kind of initiator is not sensitive to the oxygen and the reaction can be performed under normal atmosphere. The cationic photo-initiators can be chosen amongst any compound which releases a Lewis acid or a Bronsted acid on irradiation of an active energy ray, such as, for example, aryldiazonium salts ($ArN_2^+X^-$), diaryl iodonium salts ($Ar_2I^+X^-$), triaryl sulfonium salts ($Ar_3S^+K^-$), dialkyl phenacyl sulfonium salts and dialkyl-4-hydroxyphenyl sulfonium salts, Fe-arene compounds, and silanol-aluminum complexes. Most preferred examples of photo-initiators are aromatic iodonium salts and aromatic sulfonium salts, such as, for example, triarylsulfonium hexafluorophosphate (CYRACURE UVI-6992, Dow Chemical Company) triarylsulfonium hexafluorophosphate (CYRACURE UVI-6976, Dow Chemical Company), triarylsulfonium hexafluoroantimonate and arylsulphonium hexafluorophosphate (ESACURE 1064, Lamberti, Italy). Arylsulphonium hexafluorophosphate (ESACURE 1064, Lamberti, Italy) is particularly preferred.

The radiation curable resin composition preferably comprises from 1 to 10 weight percent of the photo-initiator. According to a more preferred embodiment, the radiation curable resin composition preferably comprises from 1 to 5 weight percent of the photo-initiator.

The curable resin composition of the present invention can comprise further ingredients as known in the art. For example, the resin composition can comprise adhesion promoters, surfactants, sensitizers, reducing agents, fillers and the like.

According to a preferred embodiment of the present invention, the curable resin composition of the present invention can comprise a non-photo-reactive thermal-polymerizable compound, i.e., a compound able to polymerize under thermal treatment, but not reactive under exposure to radiations in the visible or near visible region of the electromagnetic spectrum in the presence of the above mentioned cationic polymerization initiators only.

The non-photo-reactive compound is preferably an aliphatic lactone. Lactones are formed when the acid and alcohol functions are part of the same molecule. In other words, they are cyclic esters and occur in a wide range of natural substances or can be easily synthesized according to methods known in the art. Preferably, the lactones useful in the present invention have the following general formula:

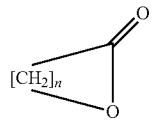

wherein n is an integer of from 1 to 10, preferably from 2 to 8, and more preferably from 4 to 6. Examples of lactones include propiolactone (n=2), butyrolactone (n=3), valerolactone (n=4), and caprolactone (n=5).

The thermal-polymerizable compound is particularly useful in case the curable resin composition of the present invention is in a liquid state during the working conditions. The thermal-polymerizable compound can undergo a polymerization reaction under thermal treatment such as for example by heating the curable resin composition of the present invention for a period of time of from 10 minutes to 60 minutes at a temperature of from 150° C. to 250° C., preferably from 180° C. to 220° C., and most preferably around 200° C. The polymerization of the-thermal-polymerizable compound increase the viscosity of the curable resin composition of the present invention until to make it substantially solid and not tacky to the touch. The Applicant has found that under these conditions, the curable resin composition is much more manageable and can be easily further processed.

The curable resin composition preferably comprises less than 40, more preferably less than 30 weight percent of the thermal-polymerizable compound. According to a more preferred embodiment, the curable resin composition preferably comprises at least 5, more preferably at least 10 weight percent of the thermal-polymerizable compound. More preferably, the curable resin composition comprises from 15 to 25 weight percent of the thermal-polymerizable compound.

Advantageously, the curable resin composition comprises from 1 to 25, preferably from 5 to 15 weight percent of a polylactone, such as, for example, polypropiolactone, polybutyrolactone, polyvalerolactone, and polycaprolactone. The Applicant noticed that the polylactone is able to reduce the mechanical stress generated during the adhesion of the nozzle plate to the barrier layer.

According to a preferred embodiment of the present invention, when using the above described thermal-polymerizable compound, the curable resin composition of the present invention can comprise a thermal polymerization initiator able to promote the start of the polymerization reaction. According to a preferred embodiment, the thermal polymerization initiator is a compound able to open the lactone ring and to start the formation of the polyester by reaction of the carboxylic group of an opened lactone molecule with the hydroxy group of another lactone molecule. Examples are represented by compounds having at least one acid hydrogen such as, for example, aliphatic and aromatic amides, aliphatic and aromatic alcohols, aliphatic and aromatic diols, aliphatic and aromatic polyols, phenols, and the like. Preferably, fluorinated aliphatic and aromatic alcohols are used.

The curable resin composition preferably comprises from 1 to 20 weight percent of the thermal polymerization initiator. According to a more preferred embodiment, the curable resin composition preferably comprises from 5 to 15 weight percent of the thermal polymerization initiator.

According to a preferred embodiment of the present invention, the curable resin composition of the present invention can comprise an adhesion promoter. The adhesion promoter, useful to further improve the adhesion of the resulting photopolymer layer, can comprise a transition metal chelate, a mercaptan, a thiol-containing compound, a carboxylic acid, an organic phosphoric acid, a diol, an alkoxysilane, a combination of an alkoxysilane and a hydroxy-functional polyorganosiloxane, or a combination thereof. The adhesion promoter can be an unsaturated or epoxy-functional compound. Suitable epoxy-functional compounds are known in the art and commercially available, see for example, U.S. Pat. Nos. 4,087,585; 5,194,649; 5,248,715; and 5,744,507 col. 45.

The adhesion promoter may preferably comprise an unsaturated or epoxy-functional alkoxysilane. Examples of suitable epoxy-functional alkoxysilanes include 3-glycidoxypropyltrimethoxysilane, 3-glycidoxypropyl-triethoxysilane, (epoxycyclo hexyl) ethyldimethoxysilane, (epoxycyclohexyl)-ethyldiethoxysilane and combinations thereof. Examples of suitable unsaturated alkoxysilanes include vinyltrimethoxysilane, allyltrimethoxysilane, allyltriethoxysilane, hexenyl-trimethoxysilane, undecylenyltrimethoxysilane, 3-methacryloyloxypropyl trimethoxysilane, 3-methacryloyloxypropyl triethoxy-silane, 3-acryloyloxypropyl trimethoxysilane, 3-acryloyloxypropyl triethoxy-silane, and combinations thereof.

The curable resin composition preferably comprises from 1 to 20 weight percent of the adhesion promoter. According to a more preferred embodiment, the curable resin composition preferably comprises from 3 to 15 weight percent of the adhesion promoter.

According to a preferred embodiment of the present invention, the curable resin composition of the present invention can comprise, when cured with an actinic energy ray and for the purpose of improving the radiation curing process, a radiation curing promoter or sensitizer in combination with the photo-initiator mentioned above. As the radiation curing promoter or sensitizer which is usable herein, sensitizing dyestuff such as (keto)coumarin, anthracene, thioxanthene, thioxanthen-9-one, perylene, and derivatives thereof, such as, for example 9,10 dialkoxy anthracene; and alkyl borates of such dyestuff as cyanine, rhodamine, safranine, malachite green, and methylene blue may be cited. These radiation curing promoters or sensitizers may be used independently either singly or in the form of a mixture of two or more members. Particularly useful radiation curing promoters or sensitizers are thioxanten-9-one, also known as thioxanthone, anthracene, and 9,10-dibutoxy anthracene.

According to a preferred embodiment of the present invention, the curable resin composition of the present invention can comprise, when cured with thermal energy and for the purpose of improving the thermal curing process, a thermal curing promoter. As the thermal curing promoter or sensitizer which is usable herein, tertiary amines such as triethylamine, triethanolamine, 2-dimethylaminoethanol, N,N-(dimethylamino)ethyl benzoate, N,N-(dimethylamino)isoamyl benzoate, and pentyl-4-dimethylamino benzoate; thioethers such as [beta]-thiodiglycol may be cited. These thermal curing promoters may be used independently either singly or in the form of a mixture of two or more members.

The curable resin composition preferably comprises from 0.1 to 10 weight percent of the curing promoters or sensitizers. According to a more preferred embodiment, the curable resin composition preferably comprises from 0.5 to 5 weight percent of the curing promoters or sensitizers.

The curable resin composition of the present invention may incorporate therein, when necessary, well-known and widely used additives such as an anti-foaming agent, an adhesiveness-imparting agent, and a leveling agent.

All percentage expressed above are referred to and based on 100 parts by weight of the curable resin composition of the present invention.

According to another aspect, the present invention also relates to a process for manufacturing an ink-jet print head comprising a polymeric material layer defining ink passageways formed on a substrate, said process comprising the steps of providing a substrate (1) comprising a plurality of ink ejection energy generating elements (2) on a surface thereof, applying a layer of curable resin composition on said surface of said substrate (1), and curing said layer of curable resin composition so as to form said polymeric material layer (5), wherein the curable resin composition comprises (a) a cyclic aromatic di-functional epoxy resin, (b) a cyclic aliphatic di-functional epoxy resin and (c) a polymerization initiator.

Preferably, the curable resin composition comprises (a) a cyclic aromatic di-functional epoxy resin obtained by the condensation of bisphenol A and epichlorohydrin having an epoxide equivalent weight (EEW) of at least 400 g/eq.

Advantageously, the curable resin composition comprises (b) a cyclic aliphatic di-functional epoxy resin represented by the following general formula (I):

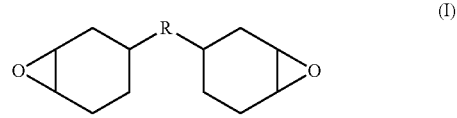

(I)

wherein R is a carboxyalkylene group of formula —(CH$_2$)$_p$—COO— or —(CH$_2$)$_q$—COO—(CH$_2$)$_r$—OOC—(CH$_2$)$_s$— and p, q, r, and s each independently is an integer of from 1 to 9.

Having reference to FIG. 1, the substrate 1 of the ink-jet print head may be of any shape or any material as long as it can function as a part of the liquid flow path constituting member and as a support for the material layers that form the ink flow path and ink ejection nozzles to be described later. The substrate can be made from glass, metal, plastic, ceramic, or silicon.

On the substrate 1 there are disposed a desired number of ink ejection energy generating elements 2 such as electrothermal converting elements or piezoelectric elements (in FIG. 1, two such elements 2 are exemplified). By the ink ejection energy generating elements 2, ejection energy for ejecting droplets of a recording liquid is imparted to the ink, and recording done. Incidentally, when an electrothermal converting element, e.g. a resistor, is used as the ink ejection energy generating element 2, this element heats a nearby recording liquid, to generate vapor bubbles in the recording liquid, thereby generating an ejection energy. When a piezoelectric element is used, on the other hand, an ejection energy is generated by its mechanical vibrations.

To these elements 2 control signal input electrodes are connected for causing these elements to act. In an attempt to improve the durability of these ejection energy generating elements, it is customary practice to provide various functional layers such as protective layers (not shown).

According to a preferred embodiment, the substrate typically includes a silicon substrate upon which a thin layer of silicon dioxide is deposited for passivating and insulating the surface of the silicon substrate. Metal trace conductors make electrical contact to the heater resistors for providing electrical pulses which selectively activate the resistors during an ink-jet printing operation, and these conductors are formed from a layer of metal previously evaporated on the upper surface of the silicon layer using conventional metal evaporation processes. Aluminum or gold or copper are usually employed as the metal for trace conductors. A plurality of heater resistors are formed on the upper surface of the silicon dioxide layer and will typically be either tantalum aluminum or tantalum pentoxide and fabricated using known photolithographic masking and etching techniques.

After the formation of the metal conductors and heater resistors is completed, a protective layer, typically of silicon carbide and silicon nitride, and an anti-cavitation layer, typically made of tantalum, are deposited over the upper surfaces of the conductors and the heater resistors to protect these members from cavitation wear due to ejection of ink bubbles and ink corrosion which would otherwise be caused by the highly corrosive ink located in the ejection chambers directly above these heater resistors. The protective and anti-cavitation layers, as well as the previously identified $SiO_2$ surface layer, resistors and aluminum conductors are all formed using semiconductor processes well known to those skilled in thermal ink-jet and semiconductor processing arts and for that reason are not described in detail herein. FIG. 1 exemplifies a form in which an opening 3 for feeding ink is provided in the substrate beforehand, and ink is fed from an ink reservoir (not shown) behind the substrate. In forming the opening, any method can be used so long as it is capable of forming a hole in the substrate. For instance, mechanical means such as a drill, or a light energy such as laser may be employed. Alternatively, it is permissible to use photolithographic techniques by applying a photoresist pattern or the like on the substrate, and chemically etch the substrate.

The curable resin composition of the present invention can be applied on the upper surface of the substrate, i.e., the surface comprising the metal conductors and the heater resistors, by using any method know in the art, such as, for example, spin-coating or spray-coating. A preferred method for applying the composition to the substrate involves centering the substrate on an appropriate sized chuck of either a resist spinner or conventional wafer resist deposition track. The curable resin composition of the present invention can be liquid at room temperature, and can be dispensed without the use of a solvent or diluent. However, a solvent or diluent can be added in certain case to adjust the viscosity of the composition. A solvent or diluent is always used in case the curable resin composition is solid at room temperature. Usually, the viscosity of the composition is in the range of from 400 cPs to 2,000 cPs, preferably from 600 to 1,500 cPs. The Applicant has found that within the above mentioned ranges of viscosity it is possible to get higher thickness without coating unevenness. If the viscosity is too low, it is difficult to get a layer having the proper thickness because the liquid composition easily flows on the substrate. If the viscosity is too high, it is difficult to get a good thickness uniformity because the liquid composition slowly flows on the substrate. The composition is either dispensed by hand or mechanically into the center of the substrate. The chuck holding the substrate is then rotated at a predetermined number of revolutions per minute to evenly spread the composition from the center of the substrate to the edge of the substrate. The rotational speed of the substrate may be adjusted or the viscosity of the material may be altered to vary the resulting film thickness. The resulting coated substrate is then removed from the chuck either manually or mechanically and, if necessary, subjected to a thermal treatment by placing it on either a temperature controlled hotplate or in a temperature controlled oven. This optional thermal treatment removes, if present, a portion of the solvent from the liquid resulting in a partially dried film on the substrate. Additionally, the optional thermal treatment promotes the polymerization of the non-photo-reactive thermal-polymerizable compound, if present in the composition. As mentioned above, the use of the non-photo-reactive thermal-polymerizable compound is particularly useful when the curable resin composition is in a liquid state. In such a case, the thermal treatment is controlled to maintain the temperature in the range of from 150° to 250° C., preferably from 180° C. to 220° C., and most preferably around 200° C. for a time period of 10 minutes to 60 minutes and preferably from 30 minutes to 50 minutes until the material has become not tacky to the touch. The Applicant has found that under these conditions, the curable resin composition is much more manageable and can be easily further processed. The substrate is then removed from the heat source and allowed to cool to room temperature.

The ink passage ways defined by the polymeric material layer formed by curing the curable resin composition of the present invention are realized by any method known in the art.

For example, the ink passage ways can be defined by forming a structural layer wherein both the barrier layer and the nozzle plate are integrally realized within a layer formed from the curable resin composition of the present invention. Alternatively, the ink passage ways can be defined by first forming a barrier layer with the curable resin composition of the present invention and then applying to the barrier layer a separately formed nozzle plate.

Figure 2:
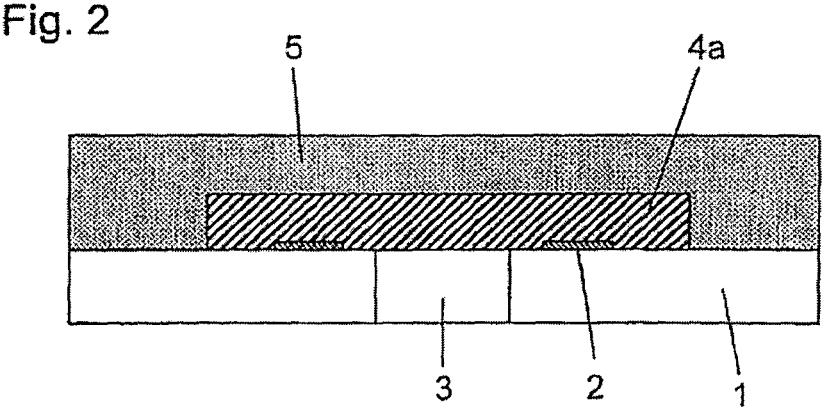
FIG. 2 shows a schematic section view of a semi-finished ink-jet print head with a structural layer.
Figure 3:
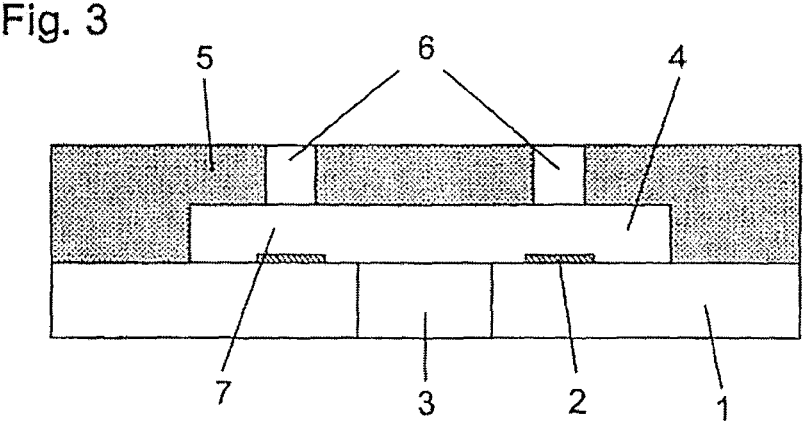
FIG. 3 shows a schematic section view of a finished ink-jet print head with a structural layer.

Having reference to FIGS. 2 and 3, when a structural layer is formed, the ink passage ways are formed by realizing a pattern 4a before applying the curable resin composition of the present invention. The most common process employed for forming the pattern 4a is a photolithographic process using a photosensitive material, usually a dissoluble resin, but other processes such as screen printing or galvanic metal deposition can be employed.

When the photosensitive material is used, a positive resist can be preferably used. The photosensitive positive resist is applied to the substrate by any method known in the art in order to form a film having the desired thickness. In order to define the pattern 4a in the resulting film, the material must be masked, exposed to a ultraviolet light source usually having a wavelength ranging from 300 to 400 nm and an energy ranging from 400 to 1,500 $mJ/cm^2$, preferably from 500 to 1,000 $mJ/cm^2$, baked after exposure and developed to define the final pattern 4a by removing unneeded material. This procedure is very similar to a standard semiconductor lithographic process. The mask is a clear, flat substrate usually glass or quartz with opaque areas defining the pattern 4a to be maintained on the coated film. The developer comes in contact with the coated substrate through either immersion and agitation in a tank-like setup or by spray. Either spray or immersion of the substrate will adequately remove the excess material as defined by the photo masking and exposure. Alternatively, when galvanic metal deposition is employed in order to define the pattern 4a, a photosensitive positive resist is applied to the substrate by any method known in the art in order to form a film having the desired thickness. With a mask not shown in any of the Figures, the photoresist is exposed to ultraviolet radiation only in correspondence with the zones where the metal has to be deposited, i.e., the zones corresponding to the ejection chambers and the connecting channels. Finally development is effected, during which the portion of depolymerized photoresist is removed, leaving in this way volumes of photoresist having the shape of the ejection chambers and the connecting channels. The development is conducted with organic solvents, such as, for example, methyl ethyl ketone, ethyl lactate, acetone, pentane-2-one, butane-2-one, xylene, propylene glycol monomethyl ether acetate (PGMEA), and mixtures thereof. Commercial solvent mixtures such as RER 500, RER 600, and RER 800, manufactured by Arch Chemicals Inc. can also be employed. In a further step, electro-deposition is performed of a metal, for example copper, gold or nickel, inside the cavities previously made, in order to form the pattern 4a.

On the pattern 4a of dissoluble resin material or metal a polymeric layer 5 is formed, as illustrated in FIG. 2, by applying the curable resin composition of the present invention.

As mentioned above, the curable resin composition of the present invention can be in a liquid state, and in such a case, preferably comprises a thermal-polymerizable compound. In these conditions, after the application, the curable resin composition of the present invention is subjected to a thermal treatment for a period of time of from 10 minutes to 60 minutes at a temperature of from 150° to 250° C. in order to polymerize the thermal-polymerizable compound and increase the viscosity of the curable resin composition of the present invention until to make it substantially solid and not tacky to the touch. In case the curable resin composition is solid, the composition is dissolved in a proper solvent and applied as described above. The evaporation of the solvent is conducted by heating the coated substrate, optionally under low pressure conditions.

After that, as depicted in FIG. 3, a pattern of ejection nozzles 6 are made in the polymeric layer 5 in correspondence with the ejection resistors 2 and the ejection chambers 7 by using techniques well known in the art such as, for example, photolithographic, plasma etching, chemical dry etching, reactive ion etching, or laser etching techniques. The dissoluble resin (or any other removable material) forming the pattern 4a of the ink passage ways is finally dissolved with a proper solvent. The dissolution is easily performed by dipping the substrate in the solvent or spraying the solvent on the substrate. Joint use of ultrasonic waves can shorten the duration of dissolution.

Figure 4:
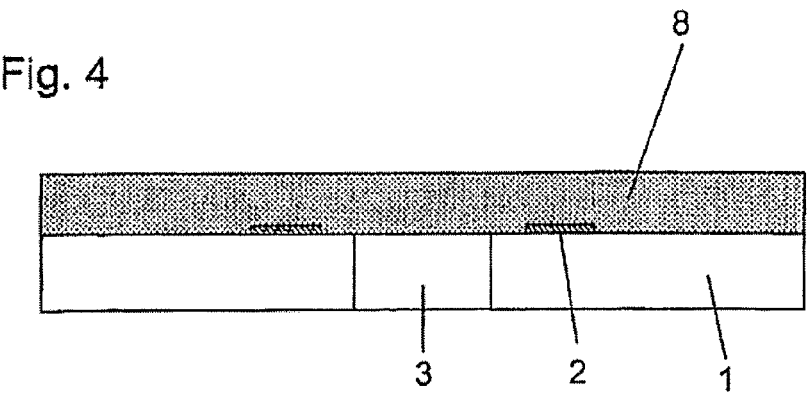
FIGS. 4 and 5 show a schematic section view of a semi-finished ink-jet print head with a barrier layer at two different steps of its manufacturing process.
Figure 5:
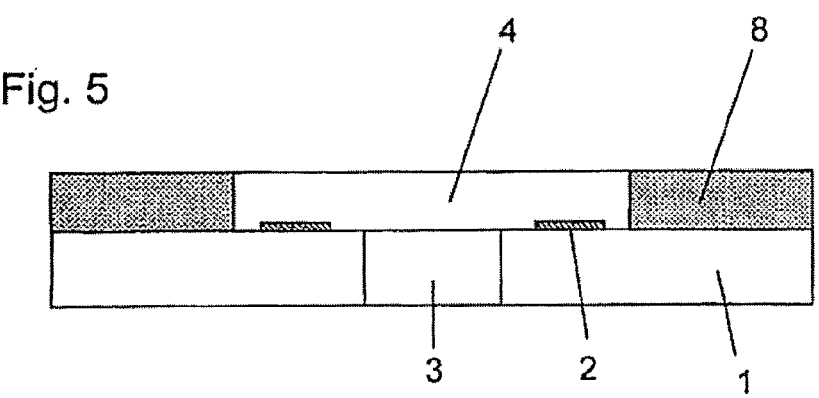
Figure 6:
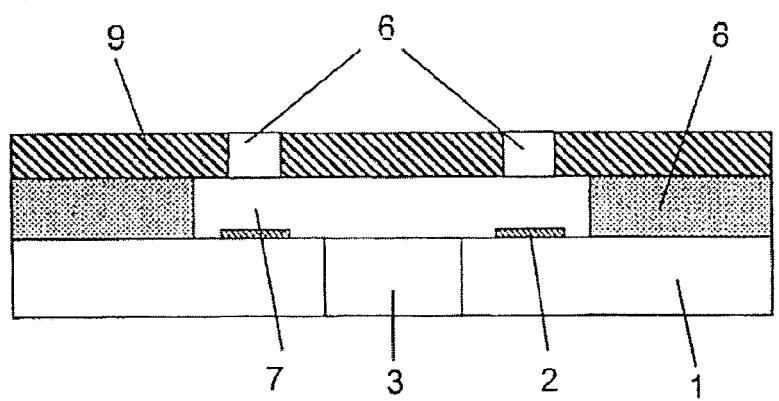
FIG. 6 shows a schematic section view of a finished ink-jet print head with a barrier layer.

According to another embodiment, having reference to FIGS. 4 and 5, when a barrier layer is formed, the ink passage ways 4 are formed by realizing a pattern within the barrier layer 8 formed with the curable resin composition of the present invention after its application on the substrate 1. Similarly to what described above for defining the pattern 4a within the dissoluble resin, the curable resin composition of the present invention can be masked, exposed to a collimated ultraviolet light source usually having a wavelength ranging from 300 to 400 nm and an energy ranging from 400 to 1,500 mJ/cm$^2$, preferably from 500 to 1,000 mJ/cm$^2$, baked after exposure and developed to define the final pattern by removing unneeded material. To develop the curable resin composition of the present invention aggressive solvents, such as propylene glycol monomethyl ether acetate (PGMEA), ethyl lactate, diacetone alcohol, ethyl acetyl acetate, and mixture thereof are preferably used. The mask is a clear, flat substrate usually glass or quartz with opaque areas defining the pattern to be removed from the coated film. After that, optionally, the patterned barrier layer 8 can be further exposed to a collimated ultraviolet light source usually having a wavelength ranging from 300 to 400 nm and an energy ranging from 400 to 1,500 mJ/cm$^2$, to increase the curing degree of the resin composition and then its chemical resistance without loosing adhesiveness to the nozzle plate 9. Finally, a nozzle plate 9 is secured to the barrier layer 8 so that the nozzles 6 are in precise alignment with the ink ejectors 2 on the substrate 1 and the ink vaporization chambers 7 of the barrier layer 8. This is accomplished by placing the bottom surface of the nozzle plate 9 against and in physical contact with the upper face of the barrier layer 8. Specifically, the bottom surface of the nozzle plate 9 is urged toward and against the upper surface of the barrier layer 8 which will self-adhere the barrier layer 8 to the nozzle plate 9. Preferably, the nozzle plate 9 and the barrier layer 8 are joined by thermo-compression bonding method, which comprises the application of a pressure at relatively high temperature. For example, during physical engagement between the nozzle plate 9 and the barrier layer 8, both of these components are subjected (e.g. heated) to a temperature of about 160°-250° C., with pressure levels of about 75-200 psi being exerted on such components. A conventional heated pressure-exerting platen apparatus may be employed for this purpose. The exact temperature and pressure levels to be selected in a given situation may be determined in accordance with routine preliminary testing taking into consideration the particular materials being used in connection with the barrier layer and the nozzle plate.

Figure 7:
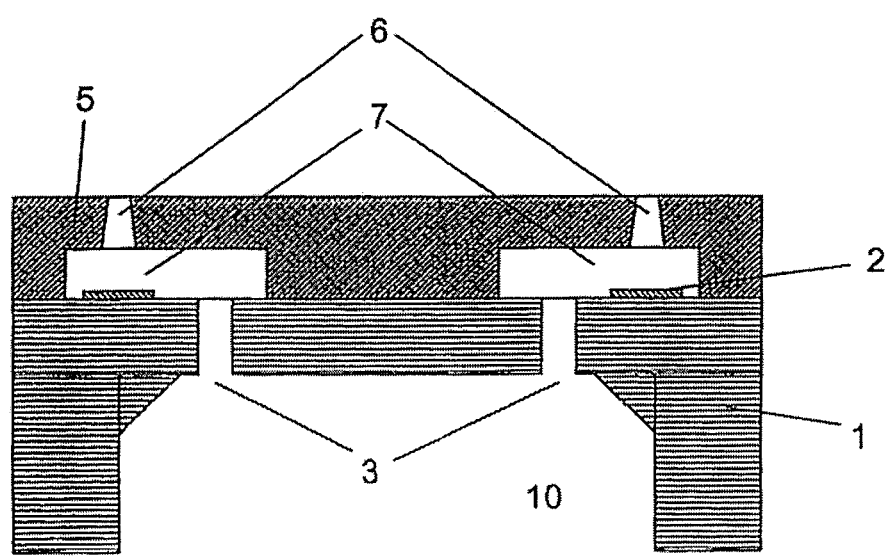
FIG. 7 shows a schematic section view of an alternative finished ink-jet print head with a structural layer.

FIG. 7 represents a schematic view of an alternative embodiment of an ink-jet print head with a structural layer 5 made of the curable resin composition of the present invention. In this embodiment, a slot 10 communicating with several ducts 3 are made in the substrate 1 in order to provide ink to the ejection chambers 7. Each ejection chamber 7 comprises an ejection nozzle 6 in correspondence with the ejection resistor 2.

The ink-jet print head of the present invention is then sealed to the ink container to form the resulting ink-jet cartridge using epoxy or silicone adhesives. Epoxy adhesive, in particular the epoxy adhesive described in patent application WO00/02730, are particularly useful for manufacturing a finished product, namely the ink-jet cartridge, fully resistant to the chemical attack of the ink-solvent.

The invention will be now described with reference to the following non-limiting example.

EXAMPLE 1

A set of curable resin compositions according to Table 1 was prepared by mixing the ingredients on a magnetic stirrer for two hours at 25° C. All numbers expressed below are referred to and based on 100 parts by weight of the final curable resin composition.

TABLE 1

| | A | B | C | D | E | F |
|---|---|---|---|---|---|---|
| ARALDITE 7072 | 24 | 21.41 | 22.75 | 22.85 | 21.28 | 21.47 |
| CYRACURE 6110 | 32 | 28.55 | 30.05 | 30.05 | 28.35 | 28.4 |
| Propylene carbonate | — | 10.77 | 5.7 | 6.07 | 5.72 | 5.5 |
| Caprolactone | 24 | 16.95 | 17.85 | 17.84 | 16.83 | 16.8 |
| 1,4-HFAB | 32 | 9.78 | 10.35 | 10.3 | 9.72 | 10 |
| SILQUEST A-187 | 19 | 3.12 | 3.37 | 3.28 | 3.09 | 3.15 |
| Tioxantone | 10.95 | 0.45 | 0.47 | 0.47 | 0.44 | — |
| Anthracene | 3.5 | 0.45 | 0.47 | 0.47 | 0.44 | — |
| UVS 1331 ANTHRACURE | — | — | — | — | — | 0.55 |
| TSHFA | 0.5 | 4.46 | 4.7 | 6.8 | 6.41 | 6.41 |

TABLE 1-continued

|  | A | B | C | D | E | F |
|---|---|---|---|---|---|---|
| ESACURE 1064 | 0.5 | 4.02 | 4.25 | 2.13 | 2.01 | 2.01 |
| Polycaprolactone | — | — | — | — | 5.67 | 5.67 |
| BYK 310 | 5 | 0.04 | 0.04 | 0.04 | 0.04 | 0.04 |

ARALDITE 7072 Solid epoxy resin based on Bisphenol A manufactured by Huntsman Corporation, Houston, Tex.

CYRACURE 6110 Tradename of a di-functional epoxy resin manufactured by Dow Chemical, Midland, Mich., USA 1,4-H FAB 1,4-Bis(2-hydroxyhexafluoroisopropyl)benzene SILQUEST A-187 Tradename of a [γ]-glycidoxypropyltrimethoxysilane available from GE Advanced Materials Co., Wilton, Conn., USA TSHFA Triarylsulfonium hexafluoroantimonate ESACURE 1064 Tradename of an arylsulphonium hexafluorophosphate manufactured by Lamberti, Italy BYK 310 Tradename of a polyester modified dimethylpolysiloxane available from BYK-Chemie GmbH, Wesel, Germany Each composition A to F was spin-coated on a substrate used to make a print head for an ink-jet printer comprising a silicon wafer having ejection resistors and gold plated active electronic components by means of a OPTIspin ST20 spinner manufactured by SSE Sister Semiconductor Equipment Gmbh at 1200 rpm for 15 seconds to provide a 25 µm thick structural layer which was subsequently heated on a hot plate at 150°-170° C. for 20 to 60 minutes, masked and exposed to UV radiation with an energy of from 500 to 1,000 mJ/cm² in a Saturn Spectrum III stepper manufactured by Ultratech Stepper Inc., California.

After that, the resulting polymeric film is heated again at 80°-160° C. for a period of time of from 30 to 180 seconds and then developed with a 1:1 W/W mixture of xylene and butane-2-one to provide sample print heads 1 to 6 (respectively including polymeric films based on compositions A to F). Finally, a nozzle plate is adhered to the patterned polymeric film by pressure at 1 to 8 bar, temperature of from 120° to 200° C. for a period of time higher than 30 minutes.

After that, each sample 1 to 6 was subjected to an aging test by immersing each sample at 65° C. for up to seven weeks in a solvent ink for ink-jet printing comprising the ingredients of the following Table 2.

TABLE 2

| Component (Function) | Amount (% w/w) |
|---|---|
| Ethanol (Main solvent) | 60.0 |
| N-methyl-2-pyrrolidone (Auxiliary solvent) | 30.0 |
| Solvent Black 29 (Colorant) | 3.5 |
| Silicon derivative (Leveling agent) | 1.0 |

The ink used in this test may contain several other common additives such as biocides, defoamers, levelling agents, or others.

The following Table 3 summarizes the results of the tests for samples 1, 4, 5 and 6. The ultimate loading, namely the load needed to detach the nozzle plate from the patterned polymeric film, was measured after 1, 3, 5 and 7 weeks of aging.

TABLE 3

| Ultimate loading (in grams) | 1 | 4 | 5 | 6 |
|---|---|---|---|---|
| At time zero | >2,000 | >2,000 | >2,000 | 2,500 |
| After 1 week | 1,780 | 1,700 | 1,000 | 1,550 |
| After 3 weeks | 2,200 | 300 | 1,000 | 800 |
| After 5 weeks | 1,600 | 300 | 800 | 300 |
| After 7 weeks | 1,550 | 200 | 800 | 300 |

The results of samples 2 and 3 are equal to those of sample 1 as compositions A, B and C only differ for the content of propilencarbonate, a non-reactive component removed during the heating step by evaporation.

Sample 1 showed a superb adhesion even after 7 weeks but the sample showed a coloration due to the permeation of the colorant into the polymeric material.

Sample 2, comprising a higher amount of photo-initiator than that of sample 1, showed a still sufficient adhesion without showing any coloration.

The best overall results were obtained with samples 3 and 4, which showed an excellent or good adhesion without any coloration.

The invention claimed is:

1. An ink-jet print head comprising a polymeric material layer defining ink passageways formed on a substrate, said polymeric material layer being formed by curing a curable resin composition comprising:
    (a) a cyclic aromatic di-functional epoxy resin obtained by the condensation of bisphenol A and epichlorohydrin having an epoxide equivalent weight (EEW) of at least 400 g/eq.,
    (b) a cyclic aliphatic difunctional epoxy resin represented by the following formula:

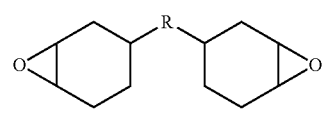

wherein R is a carboxyalkylene group of formula —(CH$_2$)$_p$—COO— or —(CH$_2$)$_q$—COO—(CH$_2$)$_r$—OCC—(CH$_2$)$_s$— and p, q, r, and s each independently is an integer of from 1 to 9, and
    (c) a polymerization initiator.

2. The ink-jet print head according to claim 1, wherein said cyclic aromatic di-functional epoxy resin has an epoxide equivalent weight (EEW) from 400 g/eq to 1,000 g/eq.

3. The ink-jet print head according to claim 1, wherein said cyclic aromatic di-functional epoxy resin is selected from the group consisting of commercial cyclic aromatic di-functional epoxy resins distributed under the trade name EPIKOTE 1001, 1001 MSQ, 1002 and 1003 (by Hexion Specialty Chemicals, Inc.), ARALDITE 6071, 7071 and 7072 (by Huntsman Corporation), and DOW EPDXY DER 661, 662E, 671, 692, 692H and 692HB (Dow Chemical Company).

4. The ink-jet print head according to claim 1, wherein said curable resin composition comprises from 5% to 40% by weight of said cyclic aromatic di-functional epoxy resin based on the total weight of said curable resin composition.

5. The ink-jet print head according to claim 4, wherein said curable resin composition comprises from 10% to 30% by weight of said cyclic aromatic di-functional epoxy resin based on the total weight of said curable resin composition.

6. The ink-jet print head according to claim 5, wherein said curable resin composition comprises from 15% to 25% by weight of said cyclic aromatic di-functional epoxy resin based on the total weight of said curable resin composition.

7. The ink-jet print head according to claim 1, wherein said curable resin composition comprises from 10% to 50% by weight of said cyclic aliphatic di-functional epoxy resin based on the total weight of said curable resin composition.

8. The ink-jet print head according to claim 7, wherein said curable resin composition comprises from 20% to 40% by weight of said cyclic aliphatic di-functional epoxy resin based on the total weight of said curable resin composition.

9. The ink-jet print head according to claim 8, wherein said curable resin composition comprises from 25% to 35% by weight of said cyclic aliphatic di-functional epoxy resin based on the total weight of said curable resin composition.

10. The ink-jet print head according to claim 1, wherein said polymerization initiator is a photo-initiator.

11. The ink-jet print head according to claim 10, wherein said photo-initiator is a cationic photo-initiator.

12. The ink-jet print head according to claim 10, wherein said curable resin composition comprises from 1 to 10 weight percent of said photo-initiator based on the total weight of said curable resin composition.

13. The ink-jet print head according to claim 1, wherein said curable resin composition comprises a non-photo-reactive thermal-polymerizable compound.

14. The ink-jet print head according to claim 13, wherein said non-photo-reactive thermal-polymerizable compound is an aliphatic lactone.

15. The ink-jet print head according to claim 13, wherein said curable resin composition comprises from 5 to 40 weight percent of said non-photo-reactive thermal-polymerizable compound based on the total weight of said curable resin composition.

16. The ink-jet print head according to claim 15, wherein said curable resin composition comprises from 10 to 30 weight percent of said non-photo-reactive thermal-polymerizable compound based on the total weight of said curable resin composition.

17. The ink-jet print head according to claim 16, wherein said curable resin composition comprises from 15 to 25 percent of said non-photo-reactive thermal-polymerizable compound based on the total weight of said curable resin composition.

18. The ink-jet print head according to claim 13, wherein said curable resin composition comprises a thermal polymerization initiator.

19. The ink-jet print head according to claim 18, wherein said curable resin composition comprises from 1 to 20 weight percent of said thermal polymerization initiator based on the total weight of said curable resin composition.

20. The ink-jet print head according to claim 1, wherein said curable resin composition comprises an adhesion promoter.

21. The ink-jet print head according to claim 20, wherein said adhesion promoter is a compound selected from the group consisting of a transition metal chelate, a mercaptan, a thiol-containing compound, a carboxylic acid, an organic phosphoric acid, a diol, an alkoxysilane, a combination of an alkoxysilane and a hydroxy-functional polyorganosiloxane, and a combination thereof.

22. The ink-jet print head according to claim 20, wherein said curable resin composition comprises from 1 to 20 weight percent of said adhesion promoter based on the total weight of said curable resin composition.

23. A process for manufacturing an ink-jet print head comprising a polymeric material layer defining ink passageways and ejection chambers formed on a substrate, said process comprising:
providing a substrate comprising a plurality of ink ejection energy generating elements on a surface thereof,
applying a layer of curable resin composition on said surface of said substrate, defining ink passageways and ejection chambers, and
curing said layer of curable resin composition so as to form said polymeric material layer, characterized in that said curable resin composition comprises:
(a) a cyclic aromatic di-functional epoxy resin obtained by the condensation of bisphenol A and epichlorohydrin having an epoxide equivalent weight (EEW) of at least 400 g/eq.,
(b) a cyclic aliphatic di-functional epoxy resin represented by the following formula:

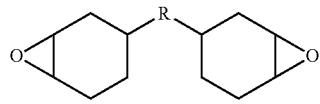

wherein R is a carboxyalkylene group of formula —(CH$_2$)$_p$—COO— or —(CH$_2$)$_q$—COO—(CH$_2$)$_r$—OOC—(CH$_2$)$_s$— and p, q, r, and s each independently is an integer of from 1 to 9, and
(c) a polymerization initiator.

24. The process for manufacturing an ink-jet print head according to claim 23, wherein said applying a layer of curable resin composition on said surface of said substrate includes spin-coating or spray-coating said curable resin composition on said substrate.

25. The process for manufacturing an ink-jet print head according to claim 23, wherein said curable resin composition comprises a non-photo-reactive thermal-polymerizable compound.

26. The process for manufacturing an ink-jet print head according to claim 23, further comprising, subjecting said curable resin composition to a thermal treatment at a temperature in the range of from 150° to 220° C. for a time period of from 10 minutes to 60 minutes before curing said layer of curable resin composition.

27. The process for manufacturing an ink-jet print head according to claim 23, further comprising, subjecting said curable resin composition to a thermal treatment at a temperature in the range of from 180° C. to 220° C. for a time period of from 30 minutes to 50 minutes before curing said layer of curable resin composition.

28. The process for manufacturing an ink-jet print head according to claim 23, further comprising forming an opening for feeding ink through said substrate.

29. The process for manufacturing an ink-jet print head according to claim 23, wherein said defining ink passageways and ejection chambers includes forming a pattern made of a removable material defining ink passageways and ejection chambers on said surface of said substrate, before applying a layer of curable resin composition, and removing said pattern made of a removable material, after curing said layer of curable resin composition.

* * * * *

UNITED STATES PATENT AND TRADEMARK OFFICE
CERTIFICATE OF CORRECTION

| | | |
|---|---|---|
| PATENT NO. | : 9,028,037 B2 | Page 1 of 1 |
| APPLICATION NO. | : 14/124155 | |
| DATED | : May 12, 2015 | |
| INVENTOR(S) | : D. Ciampini et al. | |

It is certified that error appears in the above-identified patent and that said Letters Patent is hereby corrected as shown below:

Title Page/Assignee (73) please change "Sicpa Holding SA" to -- SICPA HOLDING SA --.

Column 14, line 58 (claim 3, line 6) please change "DOW EPDXY DER" to -- DOW EPOXY DER --.

Signed and Sealed this
Twenty-fourth Day of May, 2016

Michelle K. Lee
*Director of the United States Patent and Trademark Office*